United States Patent [19]

Goffart

[11] Patent Number: 5,429,687

[45] Date of Patent: Jul. 4, 1995

[54] PROCESS FOR MANUFACTURING ALTERNATOR POLE PIECE

[75] Inventor: Andre E. Goffart, Nouzonville, France

[73] Assignee: Ateliers Thome-Genot, Nouzonville, France

[21] Appl. No.: 176,655

[22] Filed: Jan. 3, 1994

[51] Int. Cl.⁶ .................................... H02K 15/02
[52] U.S. Cl. ................................ 148/120; 148/121; 29/598
[58] Field of Search ............... 148/120, 121; 29/598; 72/254

[56] References Cited

U.S. PATENT DOCUMENTS

| | | | |
|---|---|---|---|
| 4,223,547 | 9/1980 | Epner | 72/254 |
| 4,558,511 | 12/1985 | Kato | 29/598 |
| 4,589,855 | 5/1986 | Ragaly | 464/36 |
| 4,759,117 | 7/1988 | Kato | 29/598 |
| 5,016,340 | 5/1991 | Kato | 29/598 |
| 5,296,772 | 3/1994 | Bradfield et al. | 310/242 |

Primary Examiner—George Wyszomierski
Attorney, Agent, or Firm—H. Jay Spiegel

[57] ABSTRACT

The improved process of the present invention seeks to best manage the compromise between optimization of noise reduction, power output, magnetic permeability, strength of materials and center of gravity in the manufacture of an alternator pole piece. The inventive steps include hot forging, shot blasting, Parkerization, cold coining, a two step fully finishing step including a squeezing sub-step and a bending sub-step, and an annealing step. The inventive steps result in the manufacture of an alternator pole piece which facilitates quiet operation as well as high alternator output.

19 Claims, 9 Drawing Sheets

PREFERRED ATMOSPHERE: 95% Nitrogen
5% Hydrogen

FIG. 18

FORD 1039 NON RECUIT ZONE I
BASE DENT 100 X LENS

FIG. 19

FORD 1039 NON RECUIT ZONE 2
MILIEU NOYAU 100 X LENS

FIG. 20

FORD 1039 NON RECUIT ZONE 3
BASE DENT 100 X LENS

FIG. 21

FORD 1039 RECUIT ZONE 1
BASE DENT 100 X LENS

FIG. 22

FORD 1039 RECUIT ZONE 2
MILIEU NOYAU 100 X LENS

FIG. 23

FORD 1039 RECUIT ZONE 3
BASE DENT 100 X LENS

PROCESS FOR MANUFACTURING ALTERNATOR POLE PIECE

BACKGROUND OF THE INVENTION

The present invention relates to an improved process for manufacturing an alternator pole piece. In an automobile, an alternator is commonly employed and driven via a belt coupled between the alternator and the automobile engine. Rotation of the alternator rotor results in the production of electrical power which is used, mainly, to recharge the storage battery carried by the automobile so that the automobile engine may be conveniently started as desired. In alternators as presently used in vehicles, the rotor rotates at speeds of as such as 15,000 to 22,000 revolutions per minute. In the automobile industry, at present, there is keen competition between various alternator manufacturers to provide the best alternator at the lowest price. However, the definition of the term "best" as it pertains to alternators is not always easy to comprehend.

The optimal alternator combines light weight with compact size, while providing high power output and low noise. At the heart of any alternator are the pole pieces, two in number, which are mounted in facing relationship with respect to one another on the rotor shaft and enclose, therebetween, the coil. The design of a pole piece is crucial to the enhancement of power output of an alternator and, at the same time, the pole piece is one of the greatest sources of noise generated by an alternator.

Unfortunately, steps which are taken to reduce the noise output caused by the structure of a pole piece often adversely affect the power output thereof. Additionally, the location of the center of gravity of the pole piece finger greatly affects the specific design of the gap between the rotor and stator. In this regard, with the center of gravity of the pole piece optimized, and the pole piece manufactured in an appropriate manner, the fingers of the pole piece are less likely to bend outwardly during high speed rotations of the rotor. Thus, optimal location of the center of gravity can facilitate narrowing of the gap between the rotor and stator and thereby enhancement of the power output of the alternator. However, if it is not possible to optimize the location of the center of gravity of the fingers of the pole piece, the above-described gap must be increased to account for the possibility that the fingers of the pole piece will flex outwardly during high speed rotations and, thereby, touch and damage the stator and therefore the alternator itself. In this regard, where a pole piece is made in a stamping operation with the fingers thereof subsequently bent out of the plane of the stamping, the direction of the grains of some of the fingers are at a sharp angle as compared to the base of the pole piece corresponding to the angle between the fingers and the base. Under such circumstances, the ability of the fingers to resist bending during high speed rotation is reduced. Thus, when a pole piece is made in a stamping process, the gap between the rotor and the stator must be increased to account for the probability that the fingers of the pole piece will flex outwardly during high speed rotations thereof.

As such, as should now be understood from the above discussion, the design of a pole piece for the rotor of an alternator necessarily involves compromise.

At the present level of the state-of-the-art, alternators provide sufficient power output for their size and weight that automobile manufacturers have now begun to concentrate on steps to be taken to reduce noise. The shapes and configurations of the fingers of the pole pieces are altered to enhance air flow therethrough without causing turbulence which creates noise. As such, a great need has developed for a manufacturing process which will optimize the power output of an alternator where the pole piece fingers have been designed more to enhance noise reduction than to enhance power output and therefore find the best compromise between both of these parameters. It is mainly with this problem in mind that the inventive process was developed.

In a further aspect, it is important to maintain the electrical coils of the rotor and stator of an alternator at as low a temperature as is possible. Thus, it has been known, in the past, to provide the rotor shaft with at least one ventilation fan mounted thereon exterior to the rotor housing. The ventilation fan communicates with the interior of the rotor housing via a series of slots formed therein. Such a design which is particularly shown in FIG. 1, herein, is inefficient due to the separation between the ventilation fan and the rotor. Furthermore, the use of a plurality of slots in the rotor housing causes increases in noise generation which are unacceptable to the automobile industry. Since the resistivity of copper increases with increases in temperature, efficient ventilation of an alternator will keep copper resistivity relatively low. Since copper resistivity is inversely proportional to current intensity, as the temperature increases, the current intensity in the coil of the alternator will necessarily decrease. Since magnetic flux is proportional to current intensity, the power output of an alternator is directly related to its temperature. Thus, a need has developed for an efficient system for cooling an alternator, which system does not appreciably increase noise generation thereof.

SUMMARY OF THE INVENTION

The present invention relates to an improved process for manufacturing an alternator pole piece. The inventive process includes the following interrelated objects, aspects and features:

(A) In a first aspect, in manufacturing an alternator pole piece in accordance with the teachings of the present invention, a steel rod is subdivided into small pieces in a cold shearing step. The size of each piece of the subdivided steel rod is determined based upon the desired volume subtended by the pole piece as initially hot forged.

(B) Thereafter, each piece of the subdivided steel rod is heated to just below the melting temperature of the steel so that each piece is pliable. Thereafter, each piece is shaped into an initial shape generally resembling the finished pole piece in a hot forging press. This hot forging step includes three sub-steps, a first of which involves flattening the piece with subsequent placement between the halves of two sequential sets of tooling which are pressed together to form the initial first shape of the pole piece.

(C) Thereafter, the initially shaped piece is shot blasted to remove surface irregularities such as scale and iron oxides and thereafter is chemically treated in a series of phosphating baths. This phosphating step is also known as Parkerization. The Parkerization step provides the surface of the pole piece with a lubricant which enhances the effectiveness of the subsequent cold coining process.

(D) Thereafter, the initially shaped piece is subjected to a cold coining step wherein the initially shaped piece is squeezed under high pressure to provide a reduction in the thickness while simultaneously flattening the grain structure of the steel thereby forming a second shape. The thickness reduction in certain aspects of the structure of the initially shaped piece may be as much as 10%. In a further aspect, Applicant has devised a way to conduct a cold coining process step on the initially shaped piece which causes more force to be applied in some regions of the piece than in others thereby affecting the nature of the grains of the piece in some regions differently than in other regions. Additionally, since the inventive pole piece is made of a low carbon steel, straight rows of flat grains may be formed during the cold coining process. An additional reason for performing the cold coining step is to eliminate from the initially shaped pole piece the curvatures in the surfaces thereof which were necessary to facilitate removal of the initially shaped pole piece from the hot forging press. In this regard, in the finished pole piece, some surfaces are required to be perpendicular to one another, however, were these perpendicular surfaces to be formed in the hot forging press tooling, the initially shaped pole piece would not be easily removable from the tooling in performing the manufacturing process. As such, it is necessary to provide slight deviations from the perpendicular in the hot forging press tooling to facilitate easy removal of the initially shaped pole piece from the hot forging press tooling. During the cold coining step, the required perpendicularity is provided as the metal is squeezed. During the cold coining process, a trimming step is carried out which trims from the initially shaped piece a peripheral piece of scrap which is formed at the junction of the faces of the tooling which was employed during the hot forging step.

(E) After the cold coining and trimming of the scrap from the periphery of the cold coined piece, the cold coined piece is subjected to a two step process which is described by Applicant as "fully finishing" the cold coined piece. This two step fully finishing process includes a work hardening step as well as a two step process for forming a hole through the center of the pole piece which will, thereafter, receive the rotor shaft of the alternator, as well as a two step process including a work hardening step as well as a bending step. Additionally, the fully finishing process includes a unique extruding step which is operative to cause the hole in the pole piece to be formed precisely cylindrical in shape and centrally located therein. This is essential to avoid imbalance in rotations of the resultant alternator rotor. The fully finishing process creates a third and final shape for the pole piece.

(F) Thereafter, the fully finished pole piece is subjected to a pH 14 bath to remove zinc stearates from the surface thereof and, thereafter, is annealed by subjecting it to a heating and cooling cycle in a controlled atmosphere, as will be described in greater detail hereinafter. It has been found that the presence of zinc stearates on a metallic surface prevents effective welding. By removing the zinc stearates, in this way, a ventilation fan may be welded to the rear surface of each pole piece. The annealing step acts to expand the grain structure within the pole piece so as to enhance magnetic permeability and thereby the freer flow of magnetism through the pole piece in a magnetic circuit formed between the pole pieces of the rotor and the stator of the alternator. Applicant has discovered a range of temperatures for the annealing step within which enlargement of the grain structure is enhanced to an optimal degree. Furthermore, the cooling time is specifically devised to control the degree to which carbide and pearlite in the steel enter the grain structure. Optimally, the pearlite which is found within low carbon steel is diffused inside the grain structure thereby optimizing permeability. Furthermore, the cooling time is provided to best precipitate carbide at the joints of the grains so as to enhance the ability to machine the finished pole piece. If cooling is accomplished too quickly, the carbide does not diffuse into the joints of the grains thereby causing the pole piece to be difficult to machine. The inert atmosphere which is used, comprising a combination of nitrogen and hydrogen, prevents oxidation at the surface of the pole piece during the annealing process.

(G) In making a pole piece in accordance with the teachings of the present invention, the magnetic permeability of the material is enhanced to an optimal degree as compared with pole pieces made by other entities. As such, a pole piece may be made in accordance with the teachings of the present invention with pole piece fingers designed to enhance noise reduction while optimizing the power output of the alternator containing pole pieces made in accordance with the teachings of the present invention. Since a pole piece made in accordance with the teachings of the present invention is made utilizing a hot forging process to form the fingers thereof with their grain structures parallel to the grain structures of the rest of the pole piece, the fingers are extremely strong and quite resistant to bending forces which are placed thereon when the rotor is rotated at high speeds, for example, 15,000 to 22,000 revolutions per minute. This is to be compared with the results which are obtained when a pole piece is made in a stamping operation with the fingers subsequently bent to their finished configurations. As described above, such a structure is not as resistant to the bending forces placed thereon during high speed rotation and, as such, the alternator must be designed to provide a greater gap between the rotor and stator than is the case in alternators utilizing pole pieces made in accordance with the teachings of the present invention, thereby enhancing the power output thereof.

As such, it is a first object of the present invention to provide an improved process for manufacturing an alternator pole piece.

It is a further object of the present invention to provide such an improved process including various steps specifically designed to enhance the grain structure of the finished pole piece and thereby the magnetic permeability thereof.

It is a yet further object of the present invention to provide such a pole piece made using a fully finishing process combining steps of punching, bending and machining into one two-part step to reduce costs.

It is a yet further object of the present invention to provide such a process including an annealing step carried out within an inert atmosphere.

These and other objects, aspects and features of the present invention will be better understood from the following detailed description of the preferred process when made in conjunction with the appended drawing figures.

BRIEF DESCRIPTION OF THE DRAWINGS

FIGS. 18, 19 and 2 are photomicrographs showing the grain structures at the respective regions depicted in FIG. 17 where the pole piece has not been annealed.

SPECIFIC DESCRIPTION OF THE PREFERRED EMBODIMENTS

Figure 1:
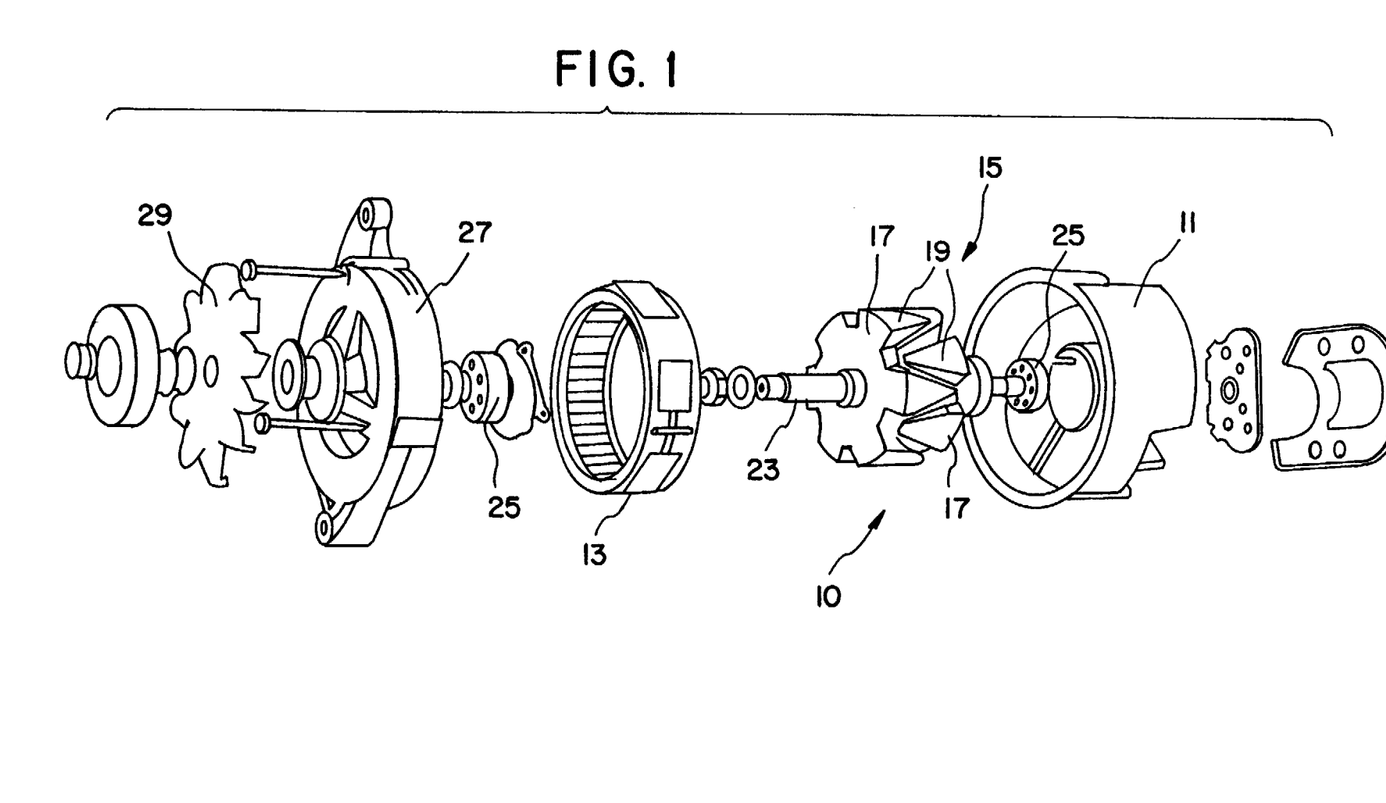
FIG. 1 shows an exploded perspective view of an alternator including pole pieces made in accordance with the teachings of the present invention.
Figure 2:
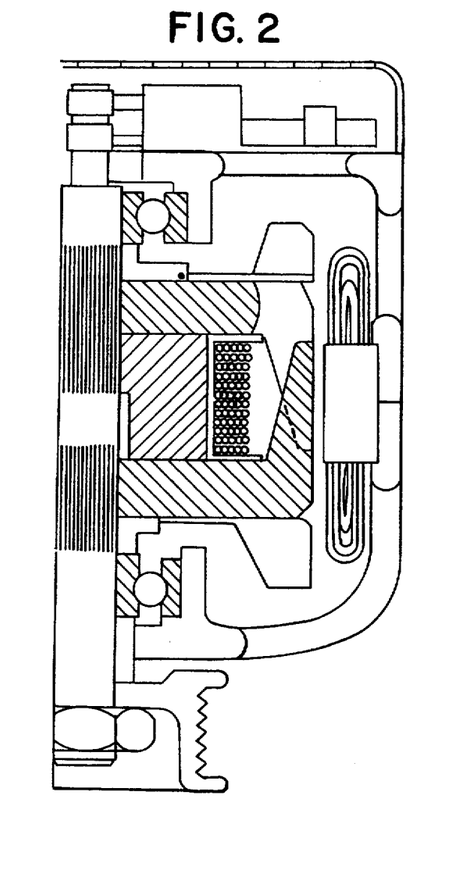
FIG. 2 shows a cross-sectional view of another alternator design, as assembled.

Reference is first made to FIGS. 1 and 2 which depict an exploded perspective view and a cross-sectional view, respectively, of two different alternators incorporating therein pole pieces made in accordance with the teachings of the present invention. In FIG. 1, the alternator is generally designated by the reference numeral 10 and is seen to include housing halves 11 and 27 which receive a stator 13 fixedly mounted within the internal chamber thereof. A rotor 15 includes pole pieces 17 having a plurality of circumferentially spaced fingers 19, which pole pieces 17 are mounted in facing relation as seen in FIGS. 1 and 2.

As best seen in the FIG. 2 alternator, a coil 21 is contained within the rotor 15' within the fingers 19' of the pole pieces 17'. The rotor 15' has a shaft 23 which is mounted on bearings 25 for rotation within the stator 13'. Additionally, each pole piece 17' has a central opening 20 sized to receive the shaft 23.

Housings 11' and 27' (FIG. 2) are provided to center the stator 13' and rotor 15' which rotor has a ventilation fan 29' rigidly welded on each pole piece 17' (FIG. 2) and constrained to move therewith to ventilate the alternator. FIG. 1 shows one alternative embodiment of a ventilator fan 29 which is mounted outside the housing 11, 27. FIG. 2 shows another alternative wherein the fans 29' are welded directly on each of the pole pieces 17' and rotate therewith.

With the above description of FIGS. 1 and 2 in mind, understanding of the particular preferred environment of use of pole pieces 17, 17' made in accordance with the teachings of the present invention should be well understood.

In practicing the inventive process, Applicant has found that the use of low carbon steel enhances the magnetic permeability of the finished pole piece due to the actions of the grain structure thereof when subjected to the inventive process. Other than the carbon, other residual trace elements which are commonly found in the low carbon steel employed by Applicant include Cr, Mo, Ni, Co, Cu, Nb, Ti, V, W, Pb, B, As, Se. As will be described in greater detail hereinafter, these trace elements play an important role in creation of the grain structure during the annealing process step.

Figure 3:
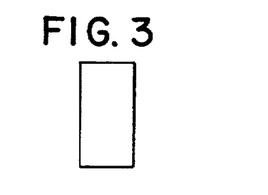
FIG. 3 shows a portion of an elongated steel rod which is formed by cold shearing.

Applicant has found that an optimal method of preparing a piece of steel for hot forging consists of obtaining the steel in elongated rods which are cold sheared to lengths (FIG. 3) providing a volume of steel in each length which corresponds, approximately, to the volume of the pole piece after hot forging. After a rod has been sheared in a manner well known to those skilled in the art, each sheared piece of steel is heated to a temperature just below the melting temperature thereof so that the steel is slightly pliable. Thereafter, each piece is individually fed to a three stage hot forging machine.

Figure 4:
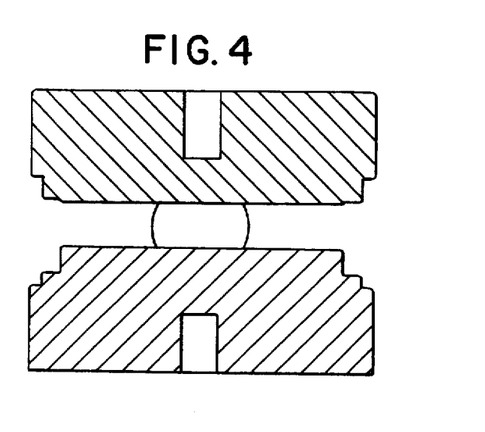
FIGS. 4, 5 and 6 show cross-sectional views through tooling utilized to perform hot forging operations on the elongated steel rod portion illustrated in FIG. 4.

The piece of steel is generally cylindrical in configuration having a generally circular periphery and a longitudinal axis of elongation. In a first stage of the hot forging step (FIG. 4), the piece of steel is placed on a support with the longitudinal axis of the piece of steel perpendicular to the plane of the support. Thereafter, the piece of steel is subjected to a reciprocating pressure to flatten it, causing the piece of steel to widen dramatically at the periphery while shortening vertically in the direction of the former longitudinal axis thereof. The described dramatic widening of the piece of steel is carried out to ensure that the material covers the entire surface of the tooling which will be employed thereafter. In a further aspect, the step illustrated in FIG. 4 is operative to remove surface flakes from the piece of steel which are created during the heating process which precedes the step illustrated in FIG. 4.

Figure 5:
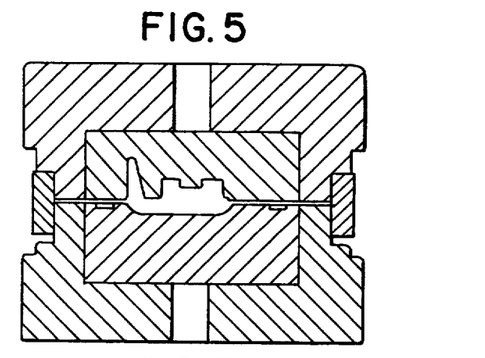
Figure 6:
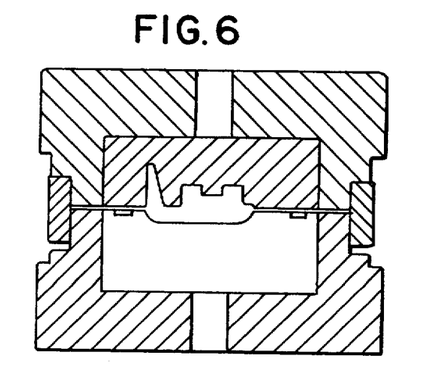

In second and third stages of the hot forging step (FIGS. 5 and 6), the flattened piece of steel is immediately placed between two halves of tooling with one half being stationary and with the other half being mounted for reciprocation with respect thereto so that the movable tooling half may be reciprocated with great force into engagement with the first tooling half with the flattened piece of steel therebetween so that forging steps are carried out, shaping the piece of steel, generally, into the shape of a pole piece. As should be understood by those skilled in the art, the inner walls of the hot forging tooling are formed with slightly obtuse angles therebetween to facilitate removal of a forged piece from the tooling. Corresponding walls in the finished pole piece will be perpendicular to one another, however, were the corresponding walls in the hot forging tooling to be made perpendicular to one another, this would result in it being difficult to remove the hot forged initially shaped pole piece from the tooling. Thus, the slightly obtuse nature of the angulation between vertical and horizontal surfaces of the tooling facilitates removal of the forged piece from the tooling for further processing. With particular reference to FIG. 5, the flattened piece of steel is pressed between the tooling halves shown in FIG. 5 to produce a piece having a volume substantially identical to the desired volume after carrying out the step utilizing the tooling illustrated in FIG. 6. The pole piece as it exists after carrying out the step utilizing the tooling of FIG. 5 is "rough" in configuration with a larger radius than its desired final radius so as to enable the material thereof to flow more easily with the smallest possible application of force and the least friction. In this way, wear on the tooling is reduced and the chance of breaking the tooling is reduced as well. After the pole piece has been subjected to the tooling of FIG. 5, the tooling of FIG. 6 is employed to precisely create the pole piece in the dimensions desired prior to cold coining which dimensions define a first shape.

After the hot forging process steps have been completed, each pole piece is sandblasted. As should be understood, since the piece of steel was heated to just below the melting temperature of the steel to facilitate the hot forging process, when the steel cools after the hot forging process has been completed, a certain amount of flaking and other surface irregularities are apparent on the surfaces of the initially formed pole piece. This sandblasting step facilitates removal of any metal flakes and any gross surface irregularities from the initially formed piece.

After each piece, as initially formed, has been sandblasted, each piece is subjected to a Parkerization process step wherein each piece is subjected to numerous baths. Sandblasting and Parkerization (phosphating) steps are well known in the manufacture of steel components and these steps as carried out herein are conventional. The Parkerization step provides the surface of the pole piece with a lubricant which enhances the effectiveness of the subsequent cold coining process.

Thereafter, each piece is subjected to a cold coining process as illustrated in FIGS. 7-10. In the cold coining process, the piece is placed in a tool and a second tool is compressed thereagainst at a pressure in the range of 50,000 to 70,000 p.s.i., thereby squeezing the metal and reducing the dimensions thereof by up to 10%. At the same time, the periphery of the tooling used for the cold coining is specifically shaped so as to eliminate the obtuse angles which were necessary, initially, to facilitate removal of the initially formed pole piece from the hot forging tooling. Thus, after the cold coining procedure is completed, the above-described surfaces are perpendicular to one another as required in a finished pole piece. The cold coining process forms a second intermediate shape.

As shown in the various Figures, a pole piece has a central raised portion known as a "half-core". In a cold coining process, the grain structure of the metal is flattened as the metal is squeezed together to reduce the dimensions thereof. Due to the dimensions of the "half-core" as seen in the Figures, and the particular dimensions of the tooling shown in FIGS. 7-10, the large area thereof causes it to receive more force during cold coining, therefore the squeezing forces thereon are greater than in other areas of the pole piece. In practice, the "half-core" of the pole piece may receive up to double the squeezing force as the periphery of the pole piece. Applicant has found that by designing the cold coining machinery to provide the enhanced squeezing force on the "half-core", the grains in the "half-core" become much larger when heated during the annealing process. Since the "half-core" is the source of flux from the coil of the alternator, the presence of larger grains in the "half-core" allows freer flow of magnetism therethrough, in other words, higher magnetic permeability exists.

Figure 7:
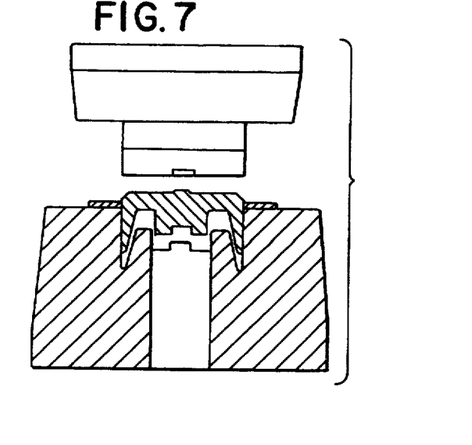
FIGS. 7, 8, 9 and 10 show respective cross-sectional views through tooling and a pole piece contained within the tooling illustrating the cold coining process step of the inventive process.
Figure 8:
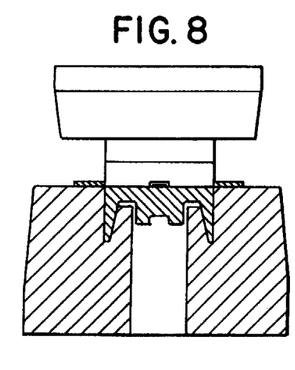

With reference to FIGS. 7-10, FIG. 7 shows the pole piece as placed between the tooling halves of the cold coining machinery prior to application of any pressure. FIG. 8 shows the upper half or punch portion of the cold coining machinery reciprocated into engagement with the pole piece and moving the pole piece downwardly so that the peripheral edges of the punch engage the opening of the bottom tooling recess to cut the flashing from the periphery of the pole piece. At this point in the cold coining process, no significant pressure is being applied on the surfaces of the pole piece. Comparing FIGS. 8 and 7, it is clear that the downward movement between FIGS. 7 and 8 has only (a) trimmed the flashing from the periphery of the pole piece, and (b) inserted the pole piece within the recess formed in the bottom tooling half.

Figure 9:
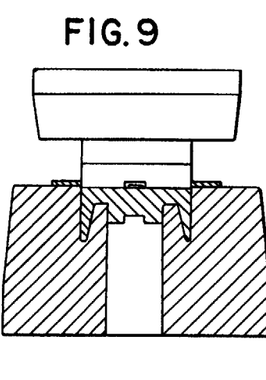
Figure 10:
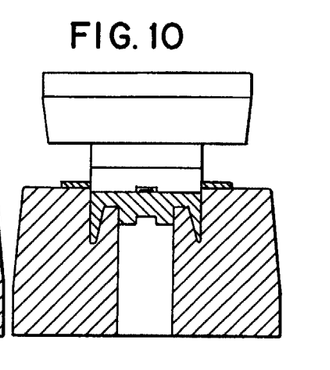
Figure 17:
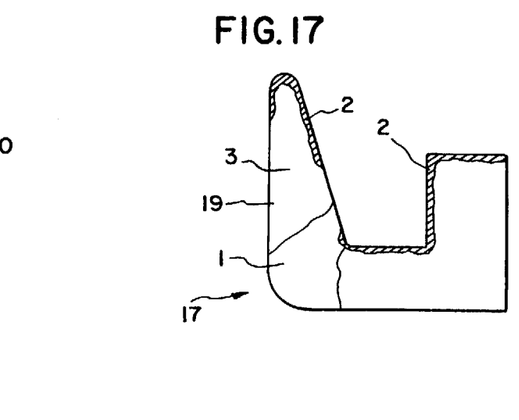
FIG. 17 shows a cross-sectional view of a portion of a pole piece identifying certain regions for which the grain structure thereof is to be analyzed.

Thereafter, as shown in FIG. 9, the upper tooling half or punch is reciprocated into engagement with the upwardly facing surface of the pole piece thereby altering the shape of the fingers as well as the outer surfaces of the "half-core". In FIG. 10, it is seen that further reciprocation of the punch causes pressure to be applied on the entire surface of the pole piece. As should be understood from FIG. 10, the tips of the fingers and the periphery of the "half-core" are subjected to more pressure than other portions of the pole piece. These areas are designated with the numeral 2 in FIG. 17 as will be described in greater detail hereinafter. As pointed out hereinafter, the effect of the greater pressure exerted on the regions 2 as illustrated in FIG. 17 is to work harden those surfaces.

It is important to note, at this point, a distinct advantage in the process practiced in manufacturing pole pieces in accordance with the teachings of the present invention, as compared to prior art methods. In one prior art method, a pole piece is forged in a flat configuration, resembling a star, with the fingers of the pole piece being formed by bending the points of the star in a bending process so that the points are perpendicular to the central portion thereof, thereby forming a pole piece in a similar shape to that which is disclosed herein. However, when such a bending operation is employed, the grains of the pole piece are not aligned with one another. That is, the grains of the fingers of such a pole piece lie perpendicular to the grains of the central portion. As compared to this, in the present invention, since the fingers and central portion are formed in a forging operation without significant subsequent bending of the fingers, all of the grains of the entire pole piece are generally aligned with one another in the same direction, thereby enhancing magnetic permeability. Thus, use of a hot forging process to form a pole piece, at least generally in its final shape, initially, is an important advance over some prior art. In a further aspect, when a pole piece is made as described above, forged in a flat configuration resembling a star with the fingers of the pole piece formed by bending the points of the star in a bending process, the finished pole piece cannot include a "half-core" as compared to the inclusive of an integrally formed "half-core" in a pole piece made in accordance with the teachings of the present invention. Thus, when an alternator rotor is constructed employing pole pieces such as those known in the prior art, often, a separate core must be inserted between pairs of pole pieces. The inherent gaps between respective opposed faces of the core and facing faces of the pole piece create two parasite air gaps which decrease the power output of the alternator. As opposed to this problem, when pole pieces are made in accordance with the teachings of the present invention wherein each pole piece has a "half-core", when the pole pieces are assembled together in the alternator rotor, the facing faces of the respective "half-cores" abut one another to create only a single potential parasite air gap, thereby reducing the loss of power output from parasite air gaps by half.

It is important to stress that when a pole piece is made in accordance with the teachings of the present invention, the near perfect symmetry of the grain direction enhances resistance to bending forces which are imposed on the pole piece fingers during high speed rotation of the rotor of the alternator. Furthermore, since the pole piece made in accordance with the teachings of the present invention includes an integral "half-core", the pole piece may be increased in thickness to therefore provide greater resistance to bending forces.

In a further aspect, Applicant has found that when low carbon steel is squeezed in a cold coining process, straight rows of flat grains are formed. Measurement of magnetic permeability at this stage in the creation of a pole piece reveals low magnetic permeability. Thus, it is important to understand that subsequent to the cold coining process, one must either recrystallize the grain structure or restore grain size to a sufficient level to enhance magnetic permeability.

During the cold coining process, as best seen in FIGS. 7 and 8, the periphery of the pole piece is trimmed to remove, therefrom, a piece of scrap which was formed during the initial hot forging process. Movement of the upper tooling half with its sharp peripheral edge cuts the periphery of the pole piece to remove this piece of scrap, which is discarded or recycled.

Thereafter, the pole piece is subjected to a two step four stage fully finishing process.

Figure 11:
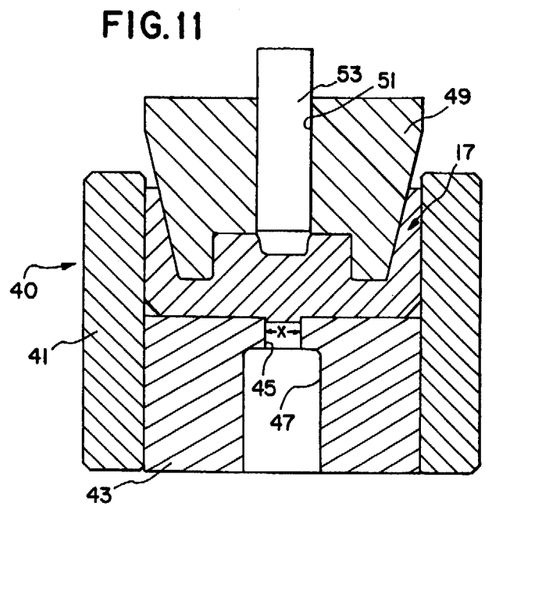
FIG. 11 shows a cross-sectional view through tooling and a pole piece contained within the tooling for a first portion of a first step of the fully finishing process of the present invention.
Figure 12:
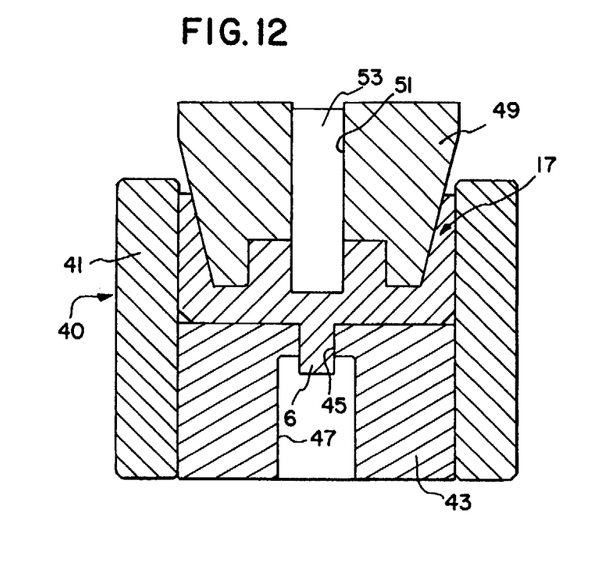
FIG. 12 shows a cross-sectional view through tooling and a pole piece contained within the tooling for a second portion of a first step of the fully finishing process of the present invention.

Reference is now made to FIGS. 11, 12, 13 and 14 which show respective cross-sectional views of the steps and stages thereof of the fully finishing process. With reference to FIGS. 11 and 12, the tooling 40 for the first stage of the fully finishing process includes an enclosure 41 enclosing a stationary tool 43 having a small opening 45, cylindrical in shape, and of a diameter X which enlarges to an enlarged chamber 47 therebelow. A reciprocating tool 49 includes a central opening 51 which slidably receives a reciprocating post 53. The post 53 is generally cylindrical in configuration and has a diameter Y greater than the diameter X. As shown in FIG. 11, in a first stage of the first step of the fully finishing process, the tool 49 is reciprocated into engagement with the upper surfaces of the pole piece 17 in such a way that certain surfaces thereof are work hardened. In this regard, attention is now directed to FIG. 17 wherein the surfaces identified by the reference numeral 2 are suitably work hardened through engagement of the tool 49 thereon.

With reference to FIG. 12, with the tool 49 maintained in firm engagement with the upper surfaces of the pole piece 17, the post 53 is reciprocated to force a portion of the "half-core" of the pole piece 17 through the hole 45 of the tool half 43 and partially into the chamber 47. This operation is known as extruding and it is important to note the greater diameter Y of the post 53 as compared to the diameter X of the opening 45. The difference in these diameters causes the opening 45 to act as a "restrictor" as that term is known in the fluid handling art. Applicant has found that by making the diameter of the opening 45 smaller than the diameter of the post 53, the hole which is formed in the pole piece 17 by the post 53 is maintained precisely cylindrical. Furthermore, the restrictive effect of the opening 45 prevents breakage of the material pushed by the post 53 before the end of this operation.

Figure 13:
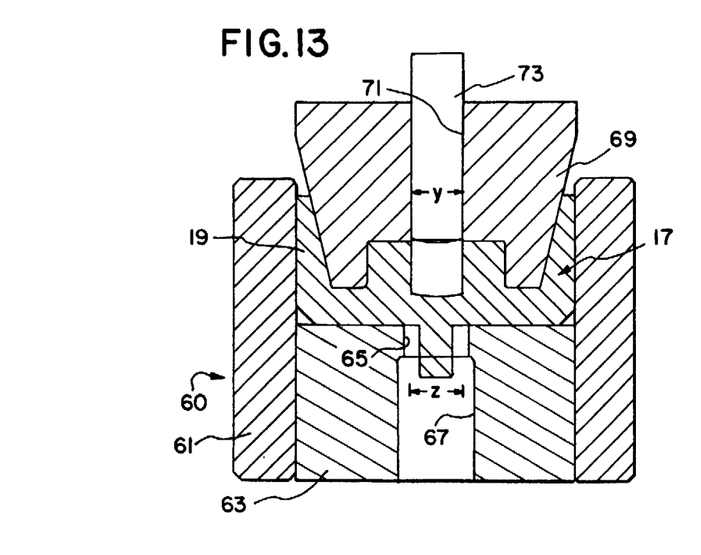
FIG. 13 shows a cross-sectional view through tooling and a pole piece contained within the tooling for a first portion of a second step of the fully finishing process of the present invention.
Figure 14:
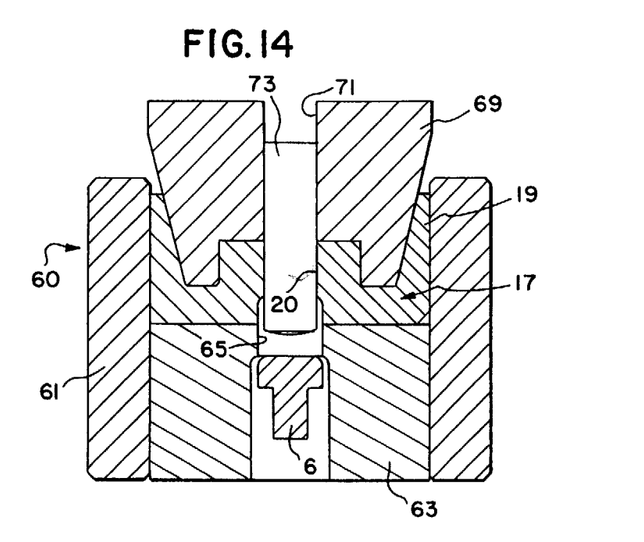
FIG. 14 shows a cross-sectional view through tooling and a pole piece contained within the tooling for a second portion of a second step of the fully finishing process of the present invention.

With reference now to FIGS. 13 and 14, the second step of the fully finishing process will be described. As should be understood, the pole piece 17 as processed in the view of FIG. 12 is removed from the tooling 40 and is placed within the tooling 60 as shown in FIG. 13. The tooling 60 includes an enclosure 61 and a bottom tooling half 63 including an opening 65 opening into a cavity 67. The opening 65 is cylindrical in configuration having a diameter Z. The tooling 60 also includes a movable tooling half 69 having a central opening 71 which slidably receives the elongated cylindrical post 73. The post 73 has a diameter Y corresponding to the diameter Y of the post 53 shown in FIGS. 11 and 12. Furthermore, the diameter Z of the opening 65 is slightly greater than the diameter Y so that the opening 65 presents no resistance to reciprocation of the post 73 therethrough. In the first stage of the second process step of the fully finishing process, as illustrated in FIG. 13, with the pole piece 17 placed on the tooling half 63, the tooling half 69 is reciprocated into engagement with the upper surfaces thereof. The tooling half 69 is provided with outer peripheral surfaces 70 which are specifically configured to bend the fingers 19 to a configuration corresponding to the desired finished configuration.

Once the tooling half 69 has been reciprocated to the position shown in FIG. 13, the post 73 is reciprocated to slice off the piece 6 and complete the hole 20 through the pole piece 17. The diameter of the opening 65 allows the post 73 to slide therethrough unimpeded by the walls thereof.

To further understand the process illustrated in FIGS. 11-14, it should be understood that the tooling half 49 shown in FIGS. 11 and 12 exerts a force on the pole piece 17 of approximately 40 Kg/mm$^2$. By contrast, the post 53 exerts a force on the pole piece 17 of in the neighborhood of 130 g K/mm$^2$ to facilitate forming of the hole 20 therethrough. At the conclusion of the fully finishing process, the pole piece is in its third and final shape.

After the fully finishing process depicted in FIGS. 11-14 has been completed, the pole piece is subjected to a pH 14 bath to remove zinc stearates from the surface thereof so that the pole piece may have a fan welded to the surface thereof. Zinc stearates prevent effective welding. With a ventilation fan welded to the rear surface of each pole piece, effective ventilation of the alternator is possible with greater noise reduction than is possible in prior art designs. With efficient ventilation being provided, the temperature of the alternator, particularly the copper coils thereof, is maintained at a relatively low level, thereby keeping the resistivity of the copper of the coils at a relatively low level to thereby enhance magnetic flux, as explained above. Thereafter, an annealing process is carried out on the pole piece. In the annealing process, the pole piece is contained within an inert atmosphere to prevent oxidation on the surface thereof. In the preferred process, the inert atmosphere consists of approximately 95% nitrogen and 5% hydrogen in a mixture. In the prior art, in order to prepare surfaces for welding, machining or brushing operations are commonly employed. Applicant has found that the use of the pH 14 bath is the most effective way of removing zinc stearates from the surfaces thereof and is more economical than machining or brushing operations. Therefore, manufacturing costs for the inventive process are necessarily reduced.

Figure 15:
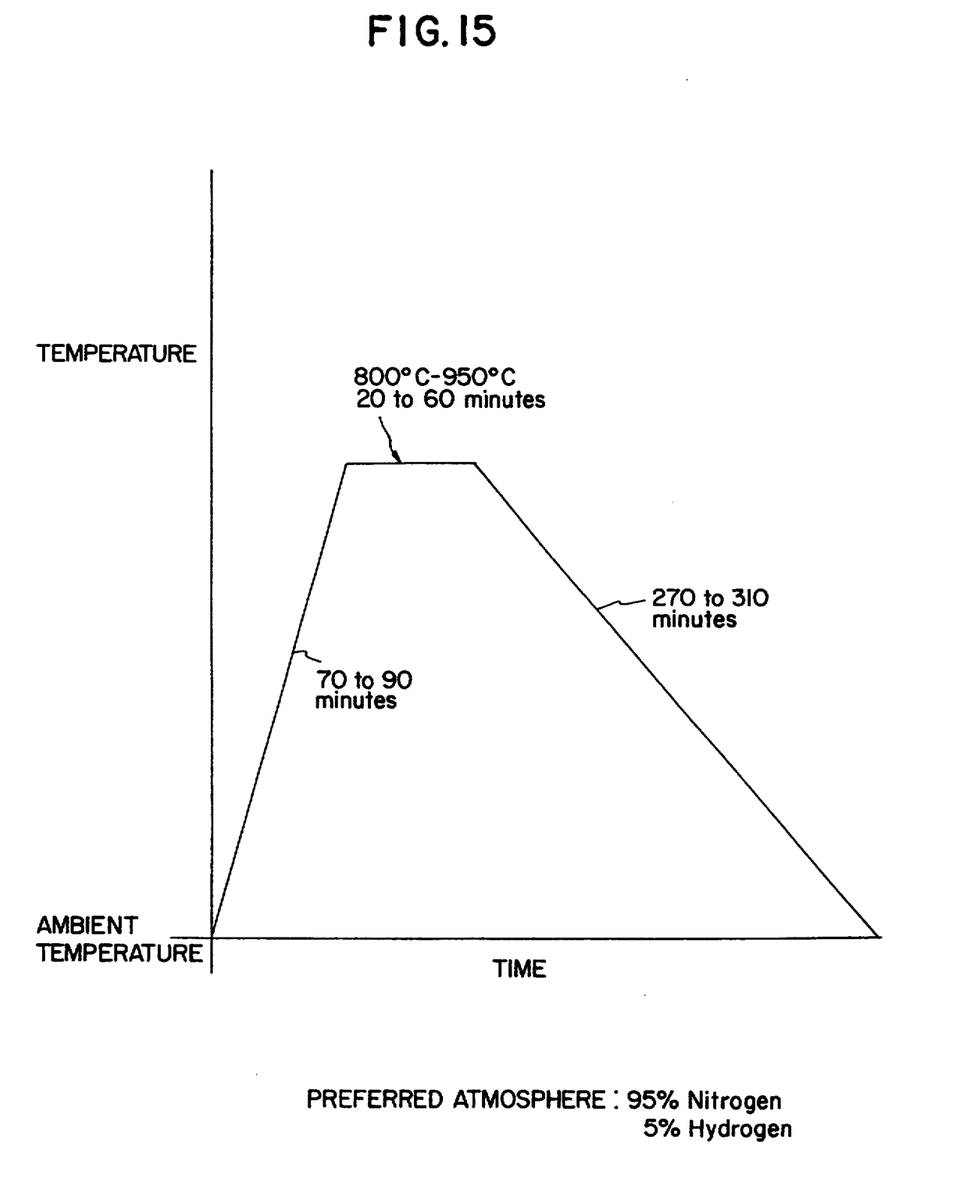
FIG. 15 shows a graph of time versus temperature for an annealing step of the inventive process.

The annealing step is better understood with reference to FIG. 15 which shows a graph of temperature versus time detailing the annealing process. The fully finished pole piece is heated from ambient temperature to 800° to 950° C. within a time period of one hour and ten minutes to one hour and thirty minutes. Thereafter, the pole piece is maintained at the maximum temperature for from twenty minutes to sixty minutes. Thereafter, the pole piece is gradually cooled back to approximately ambient temperature in a time period ranging from 270 to 310 minutes.

Applicant has found that the higher the percentage of reduction of thickness during the cold coining procedure, the lower the maximum temperature needs to be for effective annealing.

Applicant has found that the trace elements described hereinabove enter into the grain structure through diffusion during the heating phase of the annealing process while the grains are expanding. If the cooling phase of the annealing process occurs too slowly, the carbides of the iron precipitate at the joints between grains. If the cooling phase of the annealing process occurs too quickly, the pearlite which is defined as a combination of carbon and iron in the grain, diffuses throughout the grains. Under such circumstances, very few of the carbides of the iron are located at the joints between the grains. For optimal results, the time of cooling is set so that the pearlites are diffused throughout the grain structure and the carbides of iron are located at the joints.

Applicant has found that if the cooling portion of the annealing process is conducted too quickly, the resultant pole piece is difficult to machine, if machining is necessary or appropriate. Furthermore, under such circumstances, the material is not easily cut rendering the finished pole piece non-aesthetic. As such, it is easy to ascertain when the cooling portion of the annealing process has occurred too quickly due to wrenching on the surface thereof.

Applicant has further found that when the cooling portion of the annealing process is conducted in an optimal time range, the pearlite is diffused throughout the inside of the grains of the metal thereby optimizing magnetic permeability. Furthermore, when the cooling time is optimized within the range of 270 to 310 minutes, the carbides of iron are located mainly at the joints between the grains rendering the pole piece much easier to machine.

With reference now to FIGS. 17-23, certain ones of the results which accrue in practicing the inventive process will be better understood. Firstly, FIG. 17 shows a section through one half of a pole piece 17 including fingers 19. FIG. 17 shows three regions 1, 2 and 3 on the pole piece which relate to FIGS. 18, 19 and 20 as well as to FIGS. 21, 22 and 23 as will be described in greater detail hereinafter.

Figure 18:
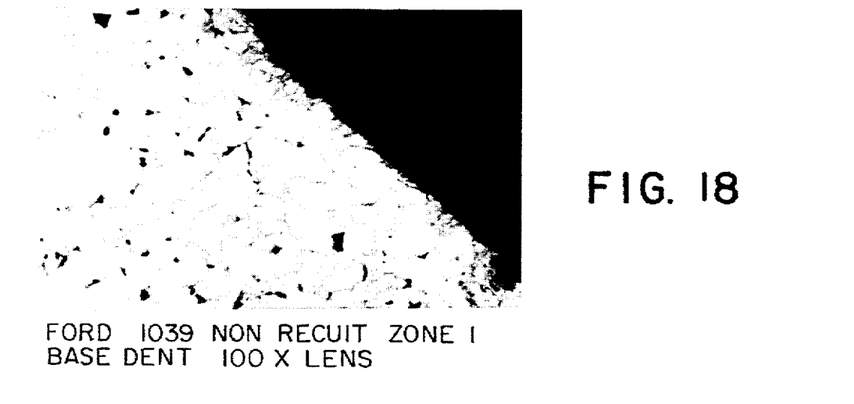
Figure 19:
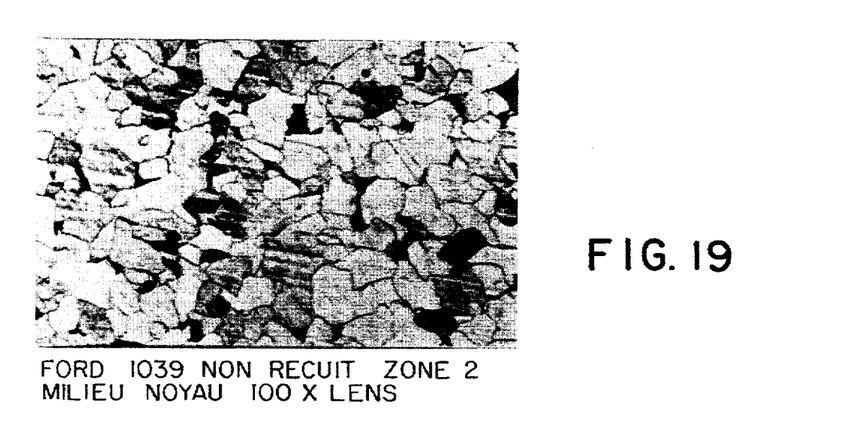
Figure 20:
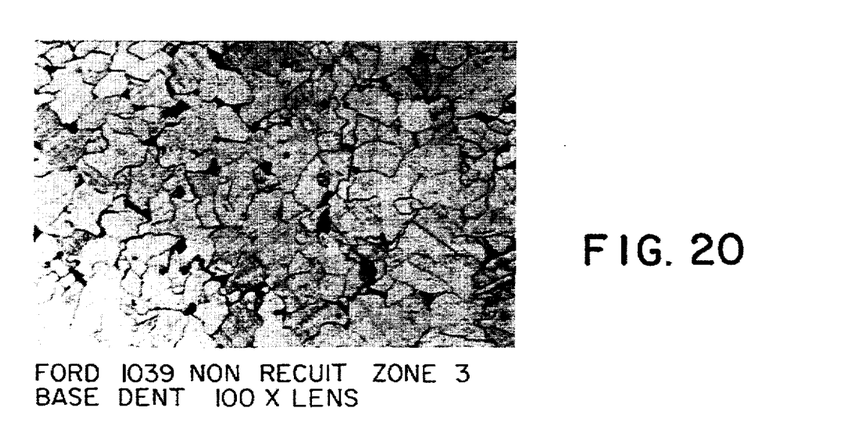

FIGS. 18, 19 and 20 comprise photomicrographs, of the respective regions 1, 2 and 3 shown in FIG. 17, for a pole piece which has been cold coined but has not yet been annealed. Particular attention is directed to FIG. 19 which shows the effect of work hardening which occurs on the surfaces of the region 2 and which is more evident when compared with the region 3 shown in FIG. 17 which is relatively unwork hardened and the region 1 which is work hardened but to a lesser degree than the region 2.

Figure 21:
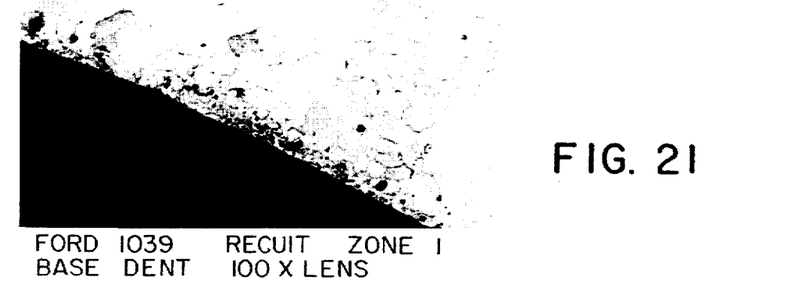
FIGS. 21, 22 and 23 correspond directly to FIGS. 18, 19 and 20, respectively, however, where the pole piece has been annealed in accordance with the teachings of the present invention.
Figure 22:
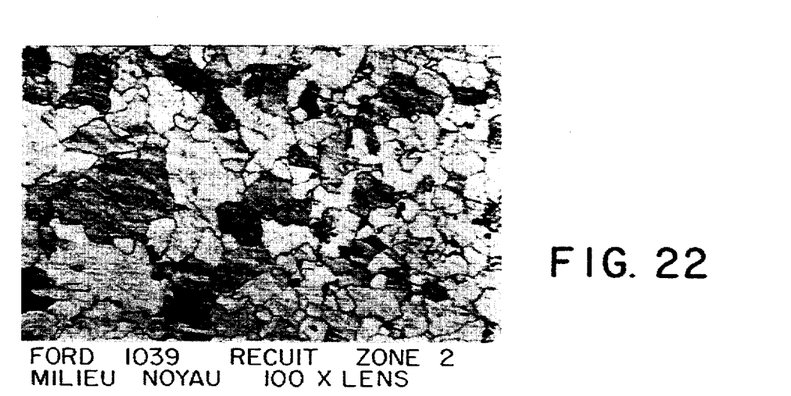
Figure 23:
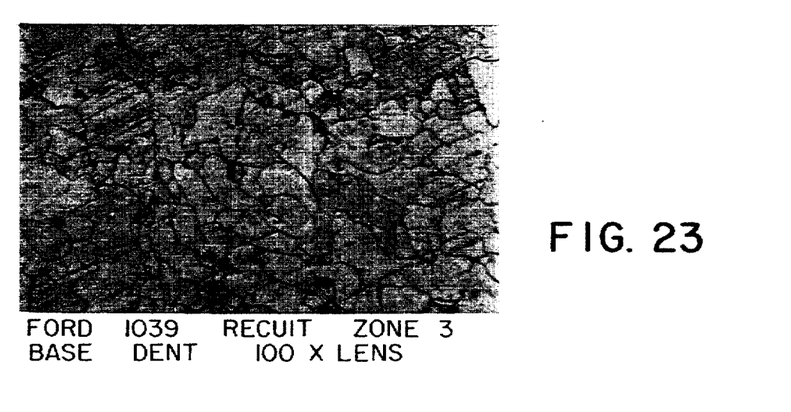

FIGS. 21, 22 and 23 generally correspond to FIGS. 18, 19 and 20, respectively, in that FIG. 21 shows the region 1, FIG. 22 shows the region 2 and FIG. 23 shows the region 3 as they are depicted in FIG. 17. However, in FIGS. 21, 22 and 23, the pole piece has been annealed including a heating temperature for the heating phase thereof of 880° C. In comparing FIG. 21 to FIG. 18, FIG. 22 to FIG. 19 and FIG. 23 to FIG. 20, one may easily observe the expansion of the grain structure comparing one to the other as well as the greater distinctness of the grain boundaries due to the heating phase of the annealing process. This should make it clear that the annealing process which is performed in accordance with the teachings of the present invention enhances magnetic permeability through expansion of the grain structure, definition of the grain boundaries and presentation of a magnetic pathway which is much less resistant to magnetic flow than would be the case were the annealing step to be omitted.

Figure 16:
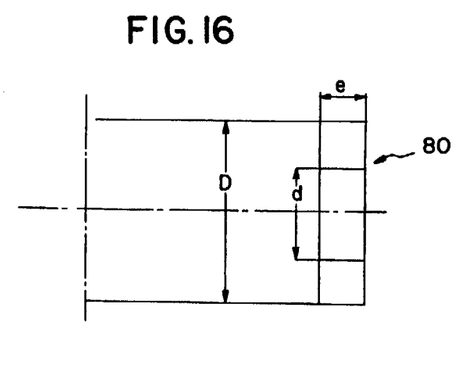
FIG. 16 shows a cross-sectional view through a ring shape utilized to take electrical measurements of a pole piece made in accordance with the teachings of the present invention.

Reference is now made to FIG. 16 which shows a cross-sectional view through an annulus which has been employed by Applicant to test the various magnetic and electrical characteristics of a pole piece made in accordance with the teachings of the present invention as compared to pole pieces manufactured using other processes.

With particular reference to FIG. 16, the annulus is generally cylindrical having a circular opening therethrough of diameter d. The annulus has an outer diameter D and a thickness, top to bottom, e. In testing the properties of a pole piece made in accordance with the teachings of the present invention, annuli such as that which is illustrated in FIG. 16 are created using, on the one hand, the process disclosed herein, and on the other hand, a competitive process. Applicant is aware that the particular process steps which were used to manufacture the material from which the competitor's annulus is formed are different from the inventive process. The annulus is fabricated from a pole piece made by a competitor using their process. In each case, the annulus is provided with an equal number of turns of wire with the ends of the wire being connected to a source of electrical current. For each inputted current level, readings were taken of the following values:

D$\Phi$: Flux variation in Milliwebers (mWb)
B: Induction in Teslas (T)

μ: Magnetic permeability (no units)
H: Ampere turns per millimeter (Atz/mm).

The annulus 80 which was manufactured in accordance with the teachings of the present invention includes the following dimensions:
D=40.118 mm
d=19.854 mm
e=10.042 mm
section=((D−d)/2)×e=101.745 mm²
length of magnetic circuit=94.203 mm.

Table I displays the results of the inputting of various levels of current from 0.25 amperes through 5 amperes.

The competitor's annulus 80 includes the following dimensions:
D=39.996 mm
d=19.938 mm
e=10.15 mm
section=((D−d)/2)×e=101.794 mm²
length of magnetic circuit=94.166 mm.

Table II shows the data collected by applying current at levels from 0.25 amperes to 5 amperes to the magnetic circuit.

Figure 24:
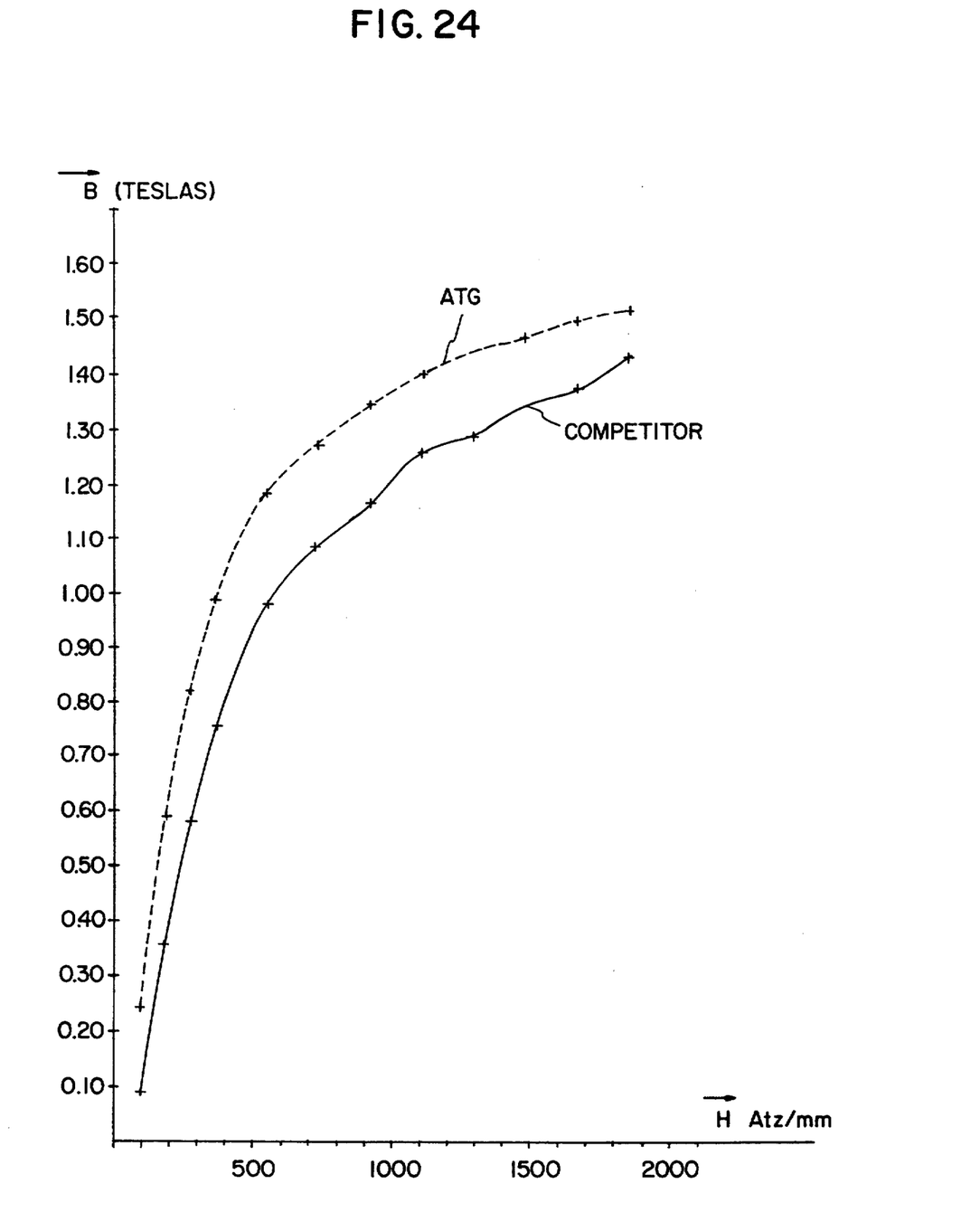
FIG. 24 shows a graph of induction in Teslas versus ampere turns per millimeter, comparing a pole piece made in accordance with the teachings of the present invention with a pole piece made by a competitor.

FIG. 24 compares Applicant's annulus versus the competitor's annulus in a graph depicting induction in Teslas versus ampere-turns per millimeter. As is clear, Applicant's annulus performed more effectively than the competitor's annulus at all levels on the graph.

Figure 25:
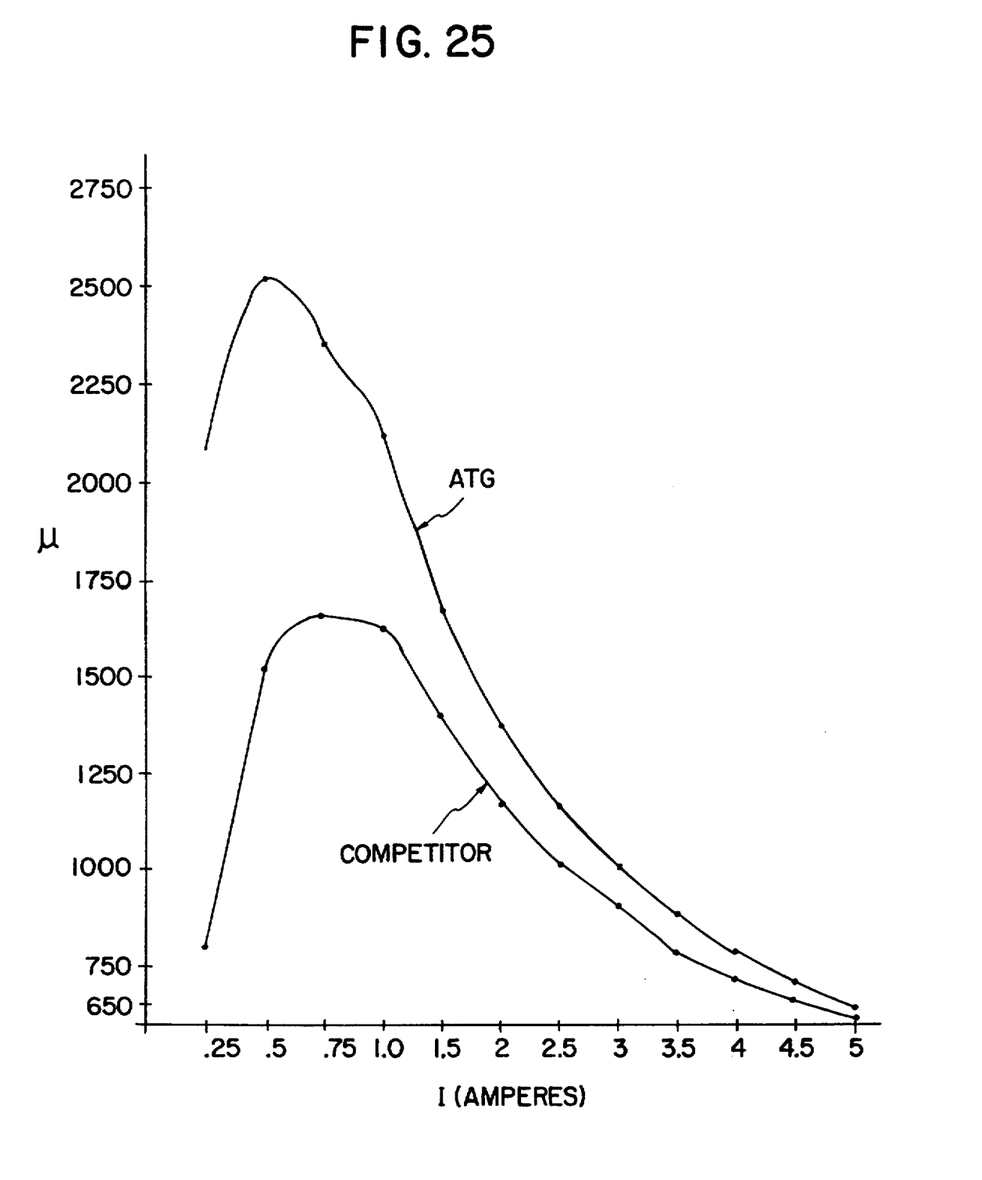
FIG. 25 shows a graph of magnetic permeability versus current in amperes, comparing the same pole pieces as in FIG. 24.

FIG. 25 depicts magnetic permeability versus the current input in amperes and also shows Applicant's annulus to be superior in magnetic permeability for each level of current input thereto. Clearly, the great advantage in magnetic permeability provided by the present invention results in enhanced performance of an alternator employing pole pieces made in accordance with the teachings of the present invention.

TABLE I

| I | DΦ | B | μ | H |
|---|---|---|---|---|
| 0.25 | 8.67 | 0.263 | 2083 | 92.8 |
| 0.5 | 21.67 | 0.589 | 2526 | 185.7 |
| 0.75 | 29.33 | 0.823 | 2352 | 278.6 |
| 1.0 | 35.33 | 0.99 | 2124 | 371 |
| 1.5 | 42.67 | 1.19 | 1710 | 557 |
| 2.0 | 45.33 | 1.273 | 1363 | 743 |
| 2.5 | 48.00 | 1.347 | 1154 | 928 |
| 3.0 | 50.00 | 1.40 | 1002 | 1114 |
| 3.5 | 51.33 | 1.44 | 882 | 1300 |
| 4.0 | 52.17 | 1.464 | 784 | 1486 |
| 4.5 | 53.33 | 1.497 | 712 | 1671 |
| 5.0 | 54.00 | 1.516 | 649 | 1857 |

TABLE II

| I | DΦ | B | μ | H |
|---|---|---|---|---|
| 0.25 | 3.33 | 0.093 | 800.25 | 93.0 |
| 0.5 | 12.67 | 0.355 | 1521.2 | 185.0 |
| 0.75 | 20.67 | 0.579 | 1654 | 278.8 |
| 1.0 | 27.00 | 0.757 | 1622 | 371 |
| 1.5 | 35.00 | 0.982 | 1400 | 557 |
| 2.0 | 39.00 | 1.09 | 1171.5 | 743 |
| 2.5 | 42.00 | 1.17 | 1009 | 929 |
| 3.0 | 45.00 | 1.26 | 901 | 1115 |
| 3.5 | 46.00 | 1.291 | 789 | 1301 |
| 4.0 | 48.00 | 1.347 | 720 | 1487 |
| 4.5 | 48.67 | 1.375 | 654 | 1672 |
| 5.0 | 51.00 | 1.431 | 612 | 1858 |

In making a pole piece in accordance with the teachings of the present invention, compromises inherent in prior art processes are eliminated and the appropriate compromise between power output, noise and weight may be appropriately struck in an enhanced pole piece. In this regard, the use of hot forging at high temperature followed by a cold coining sub-process allows one to obtain highly precise repeatable shapes. Furthermore, in accordance with the annealing sub-step of the inventive process, the resultant recrystallization of the grain structure and simultaneous expansion thereof enhances magnetic permeability to a great degree as compared with the prior art.

Furthermore, the inventive process is quite cost effective as compared to prior art processes, especially concerning the time needed and cost expended in preparing the appropriate tooling which is utilized during the manufacturing process. In this regard, based upon Applicant's experience, it is possible to prepare all of the tooling and manufacturing procedures to manufacture a pole piece in accordance with the teachings of the present invention in about one month and at a cost of from $20,000.00 to $40,000.00. As compared to this, in prior art processes, it may take from six to twelve months to prepare the tooling and manufacturing processes and at a cost of from $250,000.00 to $500,000.00.

In another example, a process of a competitor to Applicant is totally cold operated, requiring extremely high tonnage presses since hot forging is not employed. The competitor's process is quite limiting as to the shapes which may be obtained and many surface treatments and intermediate annealing steps must be employed between each of the important steps to facilitate recrystallization of the grains of the material to avoid breakage during the manufacturing process. As compared to the teachings of the present invention, the competitor's process is quite expensive and lacks flexibility.

As such, an invention has been disclosed in terms of preferred embodiments thereof which fulfill each and every one of the objects of the invention as set forth hereinabove and which provide a new and useful improved process for manufacturing alternator pole piece of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

I claim:

1. A method of making an alternator pole piece having a half-core and a multiplicity of circumferentially spaced fingers, said method including the steps of:

a) subjecting a piece of steel to a hot forging process wherein said piece of steel is shaped by hot forging tooling into a first shape generally similar to a final shape of a finished pole piece including a half-core and a multiplicity of circumferentially spaced fingers;

b) bathing said first shape in at least one phosphate bath to lubricate outer surfaces thereof;

c) cold coining said first shape using cold coining tooling to squeeze said half-core and fingers of said first shape to thereby form a second shape having flattened grain structure as compared with grain structure of said first shape, said second shape including a half-core and a multiplicity of circumferentially spaced fingers;

d) fully finishing said second shape including the steps of work hardening surfaces of said second shape fingers and half-core and forming a central opening through said second shape, said forming step including extrusion of material of said second shape through a restricted orifice, and bending said fingers to a final configuration thereof thereby forming a final third shape;

e) bathing said third shape in a highly basic bath; and f) annealing said third shape through subjection to a temperature of 800° C. to 950° C. for 20 to 60 minutes followed by gradual cooling to ambient temperature in 270 to 310 minutes.

2. The method of claim 1, wherein said hot forging process includes the steps of:

a) heating said piece of steel to slightly below a melting temperature thereof;

b) flattening said piece of steel;

c) hot forging said piece of steel into a form roughly resembling said first shape; and d) further hot forging said form into said first shape.

3. The method of claim 1, wherein said cold coining step includes the sub-steps of:

a) trimming a flashing piece from a periphery of said first shape; and b) altering a shape of said fingers while squeezing said fingers whereby perpendicularity of said fingers with respect to said half-core is provided.

4. The method of claim 1, wherein said forming step includes the sub-steps of:

a) partially forming said opening by extruding material of said second shape through a restricted orifice to form a cylindrically shaped opening and prevent breakage of said second shape; and b) thereafter, completing formation of said opening while maintaining a cylindrical shape thereof by reciprocating a post into the partially formed opening thereby forcing material from said second shape into an unrestricted opening to complete formation of said opening.

5. The method of claim 4, wherein said step of forming said final third shape occurs immediately prior to completing formation of said opening.

6. The method of claim 1, wherein prior to said step of bathing said first shape, said first shape is shot blasted to remove surface irregularities.

7. The method of claim 1, wherein said at least one phosphate bath comprises a series of phosphate baths.

8. The method of claim 1, wherein said highly basic bath has a pH of 14 and removes zinc stearates from said final third shape.

9. The method of claim 1, wherein said annealing step is carried out in an inert atmosphere.

10. The method of claim 9, wherein said inert atmosphere comprises a mixture of about 95% nitrogen and about 5% hydrogen.

11. The method of claim 1, wherein said highly basic bath has a pH of 14.

12. A method of maximizing magnetic permeability of an alternator pole piece having an integral half-core during manufacture thereof including the steps of:

a) hot forging a piece of low carbon steel;

b) cold coining said piece of steel to squeeze it and form straight rows of flat grains; and c) annealing said piece of steel by raising said piece of steel to a temperature within a range of 800°–950° C., holding temperature within said range for 20 to 60 minutes and, thereafter, gradually cooling said piece of steel to ambient temperature over 270 to 310 minutes, said annealing step causing an expansion of grain structure within said piece of steel to maximize magnetic permeability.

13. The method of claim 12, wherein said annealing step causes an expansion of grain structure within said half-core.

14. The method of claim 12, wherein said annealing step is carried out in a non-oxygen containing atmosphere.

15. A method of manufacturing an alternator pole piece to enhance a compromise between noise level and power output, comprising the steps of:

a) producing a pole piece having an outward shape and configuration designed to minimize noise level during rotation of said pole piece;

b) hot forging said pole piece to enhance alignment of grains between fingers thereof and a half-core thereof; and c) cold coining said pole piece followed by annealing said pole piece to enhance alignment and size of grains therein to thereby maximize magnetic permeability and, therefore, power output of an alternator having a rotor carrying two facing said pole pieces, said annealing step including the steps of raising said pole piece to a temperature within a range of 800°–950° C., holding temperature within said range for 20 to 60 minutes and, thereafter, gradually cooling said pole piece to ambient temperature over 270 to 310 minutes.

16. The method of claim 15, wherein said producing step includes the step of designing said fingers with respective centers of gravity located such that outward flexing of said fingers is minimized in said alternator, whereby a gap between said rotor and a stator of said alternator is made extremely small, minimization of said gap maximizing power output.

17. The method of claim 15, wherein said cold coining step includes the step of squeezing said pole piece.

18. A method of fully finishing a hot forged alternator pole piece including the steps of:

a) work hardening surfaces of said pole piece without heating said surfaces;

b) partially forming a hole in said pole piece without heating said pole piece by extruding material thereof through a restricted orifice using a single reciprocating post; and c) completing formation of said hole without heating said pole piece by punching said material through an unrestricted opening.

19. The method of claim 18, wherein said pole piece includes a multiplicity of circumferentially spaced fingers, said method including the step, after said partially forming step, of bending said fingers to a final configuration thereof.

* * * * *

UNITED STATES PATENT AND TRADEMARK OFFICE
CERTIFICATE OF CORRECTION

PATENT NO. : 5,429,687
DATED : July 4, 1995
INVENTOR(S) : Andre E. Goffart

It is certified that error appears in the above-indentified patent and that said Letters Patent is hereby corrected as shown below:

The drawing sheet, consisting of Figs. 2 - 7, should be deleted to be replaced with the drawing sheet consisting, Figs. 2 - 7, as shown on the attached page.

Column 5, line 42, "2" should read --20--.

Column 10, line 62, " 130 g K/mm$^2$ " should read -- 130 Kg/mm$^2$ --

Signed and Sealed this

Twenty-first Day of May, 1996

Attest:

BRUCE LEHMAN

Attesting Officer    Commissioner of Patents and Trademarks